Figure 9:
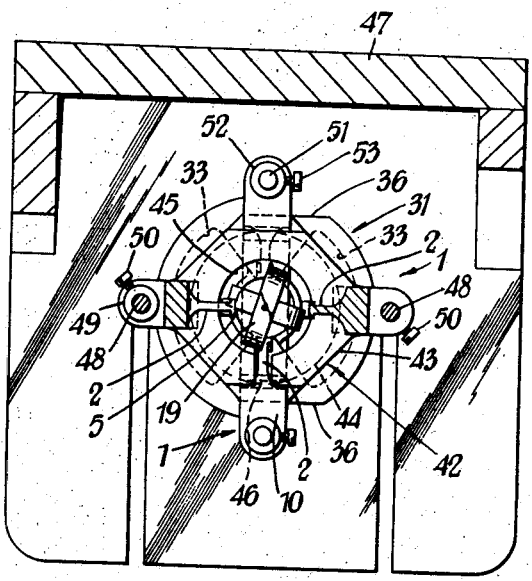

Jan. 19, 1960     L. W. PETTITT     2,922,089
DYNAMOMETER TYPE INSTRUMENTS
Filed Feb. 4, 1957     5 Sheets-Sheet 1
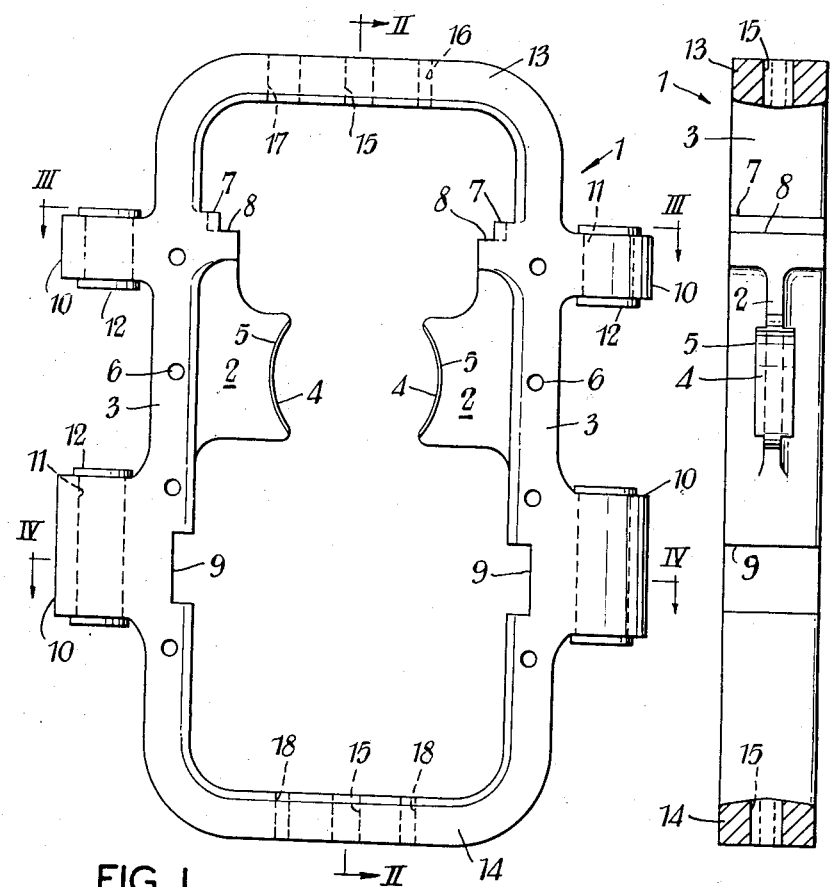
FIG. 1.     FIG. 2.
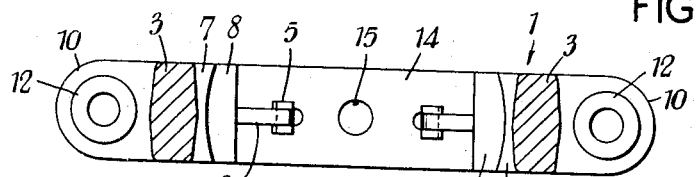
FIG. 3.
FIG. 4.
INVENTOR
LESLIE WILLIAM PETTITT
By Bailey, Stephens & Huettig
Attorneys Jan. 19, 1960

L. W. PETTITT 2,922,089

DYNAMOMETER TYPE INSTRUMENTS

Filed Feb. 4, 1957

5 Sheets-Sheet 2

INVENTOR
LESLIE WILLIAM PETTITT
By Bailey Stephens & Huettig
Attorneys

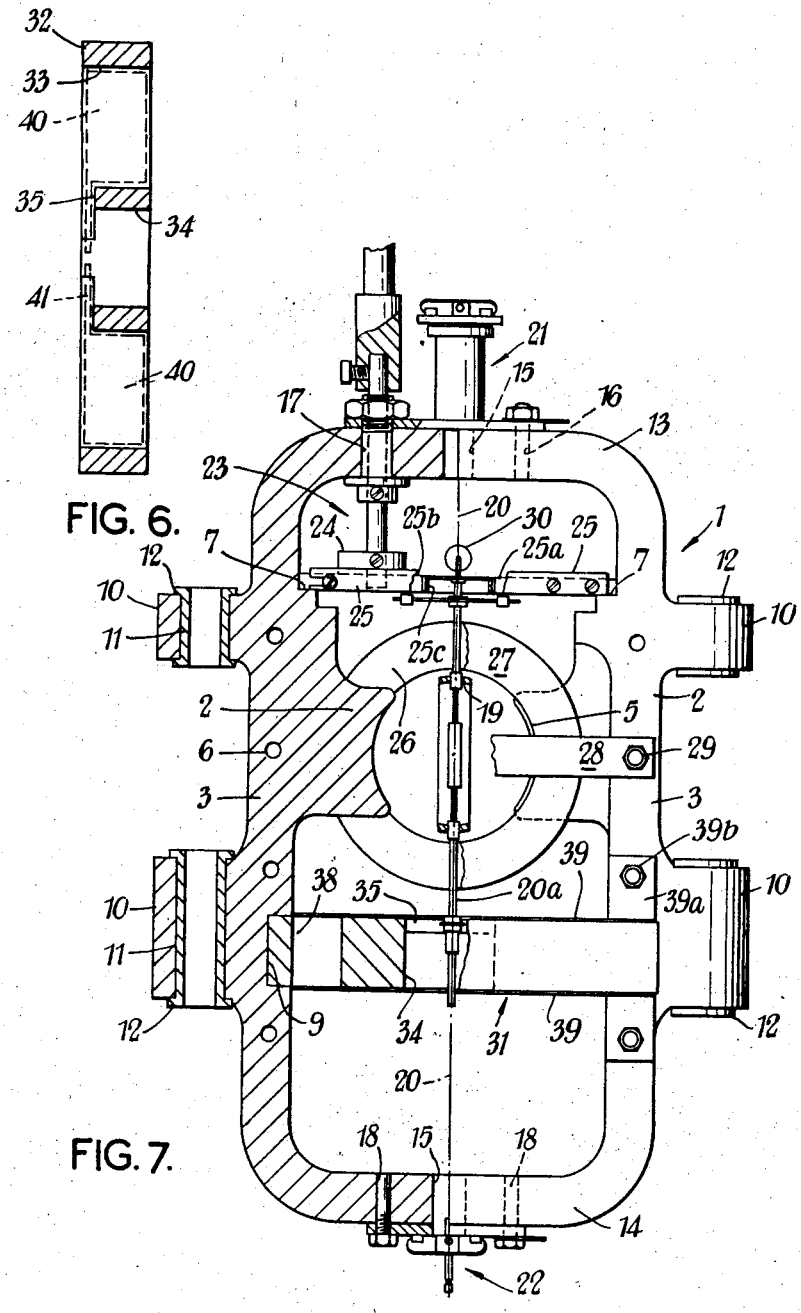

Jan. 19, 1960

L. W. PETTITT 2,922,089

DYNAMOMETER TYPE INSTRUMENTS

Filed Feb. 4, 1957

5 Sheets-Sheet 4

INVENTOR
LESLIE WILLIAM PETTITT

By Bailey Stephens & Huettig
Attorneys

Jan. 19, 1960   L. W. PETTITT   2,922,089
DYNAMOMETER TYPE INSTRUMENTS
Filed Feb. 4, 1957   5 Sheets-Sheet 5

INVENTOR
LESLIE WILLIAM PETTITT
By Bailey, Stephens & Huettig
Attorneys

United States Patent Office 2,922,089
Patented Jan. 19, 1960

2,922,089
DYNAMOMETER TYPE INSTRUMENTS

Leslie William Pettitt, Reigate, England, assignor to Elliott Brothers (London) Limited, Lewisham, London, England, a company of Great Britain Application February 4, 1957, Serial No. 637,943

Claims priority, application Great Britain February 6, 1956

12 Claims. (Cl. 317—166)

This invention relates to improvements in dynamometer type instruments in which a moving coil is mounted for rotation and is substantially symmetrically disposed with respect to a fixed coil so that the moving coil is subjected to a turning moment which is a function of the magnitude of the electrical quantities applied respectively to the fixed and moving coils, and is particularly, but not exclusively, concerned with an improved mounting for the fixed coil. The moving coil may be mounted on a spindle carried by its ends in bearings, it may be mounted on a spindle connected at each end to a fine wire or fibre suspension or it may be carried directly on a fine wire or fibre suspension as will be understood. All such mountings for the moving coil will be referred to hereinafter as "the suspension." It is preferred in such instruments to split the fixed coil into two substantially equal parts disposed one on either side of the plane containing the axis of rotation of the suspension and substantially parallel to the latter.

It is an object of the present invention to provide an improved mounting for the fixed coil of a dynamometer type instrument which shall be economic and simple to manufacture, which may be readily assembled in a dynamometer type instrument by semi-skilled labour and which may be modified in a relatively simple manner for use in a dynamometer type instrument embodying a plurality of moving coils carried by the suspension and each associated with a separate fixed coil whereby the resultant turning moment exerted on the suspension is the algebraic sum of the turning moments to which the individual moving coils are subjected.

According to one feature of the present invention means for mounting the fixed coil of a dynamometer type instrument comprises a limb having a lug formed intermediate its length, a shoulder formed on the limb to one side of the lug, and means formed on the limb for locating it in a desired position in the instrument.

According to another feature of the present invention means for mounting the fixed coil of a dynamometer type instrument comprises two limbs, means for retaining the limbs in spaced parallel relationship, two opposed inwardly directed lugs formed one on each limb for supporting the fixed coil, a shoulder formed on each limb to one side of the associated lug, a groove formed in each limb to the other side of the associated lug, and means formed on at least one limb for locating the limbs in a desired position in the instrument.

The means for retaining the limbs in spaced parallel relationship may comprise a further limb connecting the two limbs at their one ends and/or a still further limb connecting the two limbs at their other ends. Alternative or additionally the retaining means may comprise a locating element arranged to co-operate with the shoulders on the limbs and/or a dash-pot device or a further locating element located in the grooves formed in the limbs.

According to a further feature of the present invention means for mounting the fixed coil of a dynamometer type instrument comprises a substantially rectangular frame member, two opposed inwardly directed lugs formed one on each of two opposed limbs of the frame member for supporting the fixed coil, a shoulder formed on each of the two limbs to one side of the associated lug, the shoulders being capable of supporting an element capable of engaging the suspension, e.g. a clamping element, or of co-operating with a locating element, a groove formed in each of the two limbs to the other side of the associated lug, the grooves being capable of locating and supporting a dash-pot device or of receiving a further locating element, and means formed on at least one of the two opposed limbs for locating the frame member in a desired position in the instrument.

Preferably the frame member is formed from an insulating material such as, for example, that sold under the trademark "Mycalex," by a casting or moulding operation, the lugs, shoulders, grooves and locating means being formed during the operation.

According to a still further feature of the present invention a dynamometer type instrument embodying at least two moving coils carried by the suspension and arranged one above the other for rotation about a substantially vertical axis, alternate moving coils being disposed at right-angles to each other, comprises a plurality of mounting means according to either of the two immediately preceding paragraphs corresponding in number to the number of moving coils and arranged one above the other with the shoulders disposed above the associated lugs and with the lugs on each frame member supporting a fixed coil which, in the zero position of the instrument, is disposed at right-angles to the associated moving coil wherein the two opposed limbs of the uppermost frame member are cut off below the grooves formed therein thereby removing that limb of the frame member connecting the adjacent ends of the two opposed limbs, a locating element is fixed in a non-rotatable manner in the grooves in the uppermost frame member, the locating element having a downwardly depending annular portion the outer surface of which is cylindrical, the two opposed limbs of the lowermost frame member are cut off above the shoulders formed thereon thereby removing that limb thereof connecting the adjacent ends of the two opposed limbs thereof, a recess is formed in the shoulders of the lowermost frame member to receive as a rotatable fit the downwardly depending annular portion of the locating element fixed in the grooves of the frame member immediately above the lowermost frame member, and, where more than two moving coils are embodied, the remaining frame members have the two opposed limbs cut off both below the grooves formed therein and above the shoulders formed thereon, the grooves in each frame member except the lowermost having fixed therein a locating element and the shoulders of each frame member except the uppermost being grooved to receive as a rotatable fit the downwardly depending portion of the locating element fixed in the grooves of the frame member immediately thereabove, alternate frame members are connected together by means co-operating with the locating means formed on at least one of the two opposed limbs thereof and fixedly mounted in the instrument and the remainder of the frame members are connected together by means co-operating with the locating means formed on at least one of the two opposed limbs thereof whereby said remainder of the frame members may be rotated relative to the alternate frame members fixedly mounted in the instrument.

A dash-pot device may be conveniently located and supported in the grooves in the lowermost frame member or, where the instrument employs electrical feed-back to damp the rotation of the suspension, the grooves in the lowermost frame member may locate and support an element which lends rigidity thereto, and which, where the moving coils are carried on a spindle mounted in bearings, may carry the bearing for the lower end of the suspension.

Figure 5:
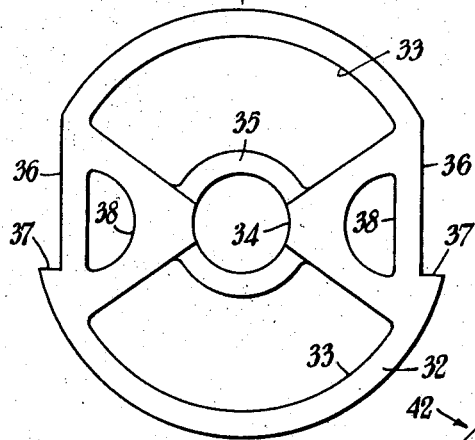
Figure 10:
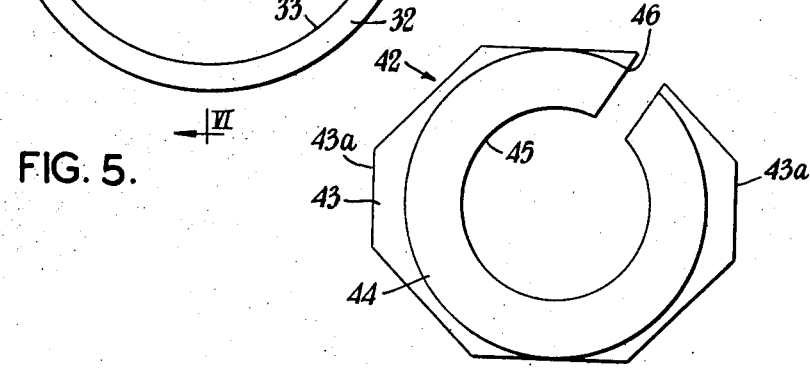
Figure 8:
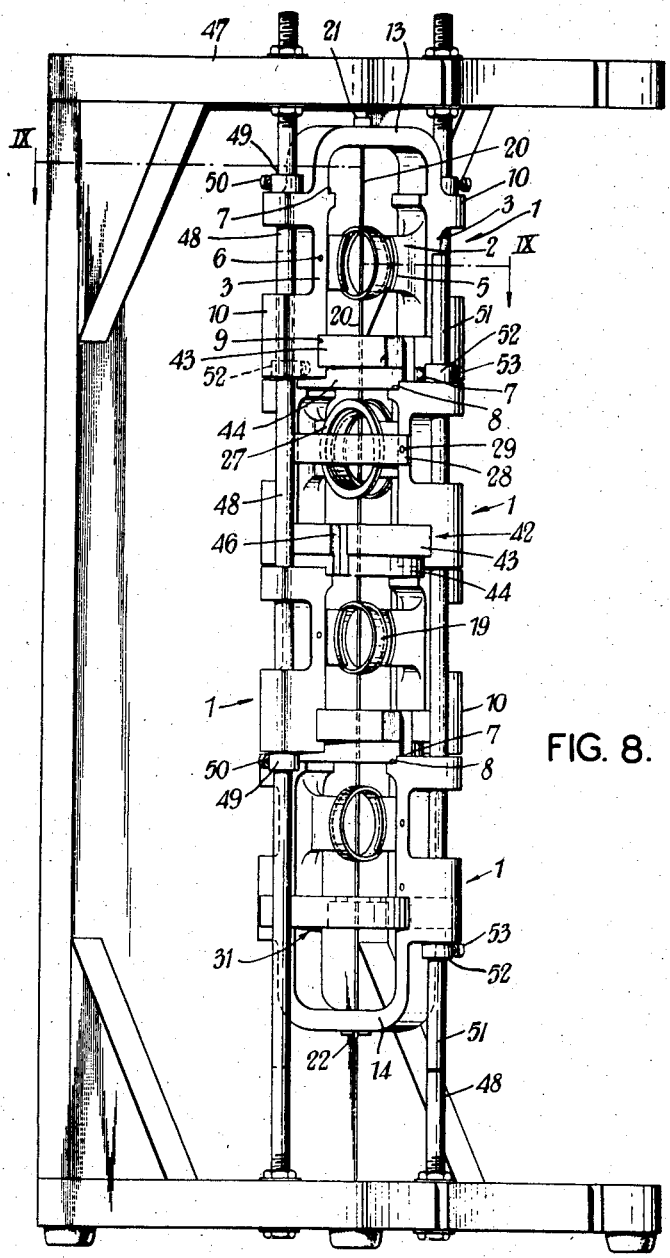
Figure 11:
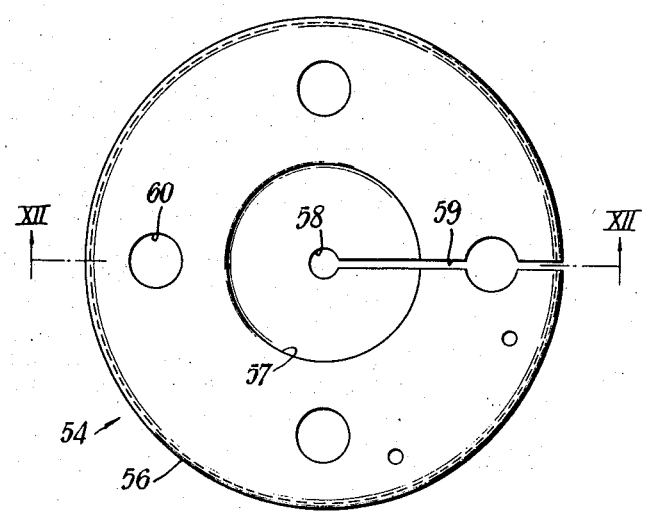
Figure 12:
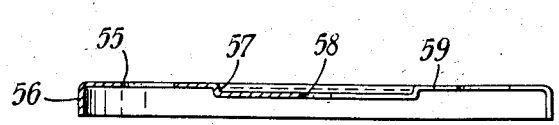
Figure 13:
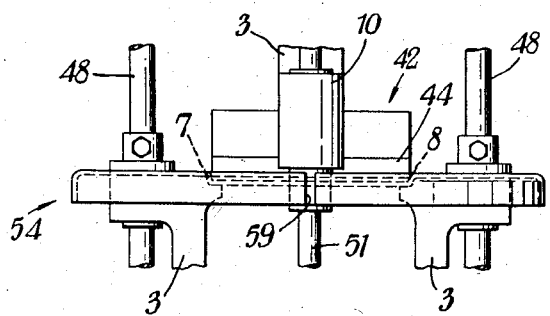

In order that the invention may be more clearly understood some examples thereof will now be described by way of example, reference being made to the accompanying drawings in which:

Fig. 1 is a side elevation of a means for mounting the fixed coil of a dynamometer type instrument constructed in accordance with the present invention, Fig. 2 is a section taken on the line II—II of Fig. 1, Fig. 3 is a section taken on the line III—III of Fig. 1, Fig. 4 is a section taken on the line IV—IV of Fig. 1, Fig. 5 is a plan view of a dash-pot device for use with the mounting means of Fig. 1, Fig. 6 is a section taken on the line VI—VI of Fig. 5, Fig. 7 is a part-sectional, part elevational view of a part of a dynamometer type instrument embodying only a single moving coil and including the mounting means of Fig. 1 and the dash-pot device of Fig. 5, Fig. 8 is an elevational view of a part of a dynamometer type instrument embodying four moving coils and including mounting means similar to that shown in Fig. 1 for each of the fixed coils, all but one of the latter being omitted for clarity, Fig. 9 is a section taken on the line IX—IX of Fig. 8 with parts omitted and with the moving coils displaced through a small angle in the clockwise direction, Fig. 10 is an under plan view of a locating element such as is incorporated in the instrument shown in Fig. 8, Fig. 11 is a plan view of a shielding element, Fig. 12 is a section taken on the line XII—XII of Fig. 11, and Fig. 13 is a fragmentary elevational view of an instrument similar to that shown in Fig. 8 incorporating the shielding element shown in Figs. 11 and 12.

The mounting means illustrated in Figs. 1 to 4 for a dynamometer type instrument comprises a substantially rectangular frame member indicated generally at 1 having two opposed inwardly directed lugs 2 formed one on each of two opposed limbs of 3 of the frame member 1. The opposed faces 4 of the lugs 2 are widened by flanges 5 formed on the lugs and lie on the surface of a cylinder having its axis normal to the medial plane passing through the four limbs of the frame member. The flanges 5 are relatively thin and their outer surfaces lie on a cylinder co-axial with that containing the opposed faces of the lugs 2. These flanges are adapted to support the two substantially equal parts of a fixed coil one part on each side of the lugs 2 in the manner to be described with reference to Fig. 7 and the limbs 3 adjacent the lugs 2 have bores 6 therethrough to receive bolts for securing strips whereby the parts of the fixed coil are retained on the flanges 5. The limbs 3 are each formed with a shoulder 7 to one side of the lugs 2 and the shoulders 7 are formed with a recess 8 which is part cylindrical. For ease of moulding the frame member 1 the recesses 8 may taper slightly towards the lugs 5. Each limb 3 is also formed with a groove 9 to the other side of the lugs 2 the purpose of which will become apparent hereinafter and each limb 3 is formed with two outward projections 10, the two projections 10 on each limb having co-axial bores 11 extending therethrough within which are disposed metal bushes 12. The remaining two limbs 13 and 14 of the frame member are each formed with a central bore 15, the bores 15 in the two limbs being co-axial. The limb 13 is formed with a further bore 16 therethrough to one side of the bore 15 and with a larger bore 17 on the other side of the bore 15. The limb 14 is formed with two further similar bores 18 therethrough one on either side of the bore 15. As will appear below the bores 16 and 18 are intended to accommodate bolts and it will be appreciated that instead of these bores 16 and 18 there may be provided threaded studs formed integrally with limbs 13 and 14.

The substantially rectangular frame member is preferably formed from an insulating material such as that sold under the trademark "Mycalex" by a casting or moulding operation, the lugs 2, flanges 5, shoulders 7, grooves 9 and projections 10 being formed integrally with the limbs 3, 13 and 14 during the operation and the various bores being also preferably formed during the operation. The recesses 8 may also be formed during the operation or they may be machined in the shoulders 7 at a later stage if required.

The recesses 8 are not required in the instrument shown in Fig. 7 and are therefore omitted. This instrument embodies only a single moving coil 19 which is carried by a spindle 20a connected at its ends to fine suspension wires 20 which pass through the bores 15 in the limbs 13 and 14 of the frame member 1, the ends of the wires 20 being received in mounting devices indicated at 21 and 22 carried by the limbs 13 and 14 respectively and secured by bolts passing through the respective bores 16 and 18. The spindle of a clamping element 23 passes through the bore 17 in the limb 13, the clamping element briefly comprising a cam 24 adapted to co-operate with a resilient strip 25 which extends over the open side of a part-circular recess 25a formed in a member 25b. A cylinder 25c is attached to the upper end of the spindle 20a and is largely received within the recess 25a and the arrangement is such that in one position of the cam 24 the strip 25 bears against the part of the cylinder 25c not disposed in the recess 25a so that the cylinder 25c is clamped between the base of the recess 25a and the strip 25 to prevent the cylinder 25c and the spindle 20a rotating, e.g. for transportation, and in the other position of the cam 24 the strip 25 is clear of the cylinder 25c to free the spindle 20a. The strip 25 and the member 25b are carried on the shoulders 7 of the frame member 1. The two substantially equal parts 26 and 27 of the fixed coil are carried by the flanges 5 on the lugs 2 and a strip 28 of insulating material extends across the frame member 1 between the limbs 2 to urge the coil part 27 against the flanges 2 and hold it in position, the strip 28 being secured to the limbs 2 at its ends by bolts 29 passing through the respective bores 6. It will be understood that the bolts 29 also serve to secure a strip similar to the strip 28 in position on the other side of the frame member 1 to hold the coil part 26 in position. Instead of the bores 6 to accommodate bolts 29 threaded studs may be formed integrally with the limbs 3. The upper suspension wire 20 carries a mirror 30 whereby the degree of rotation of the suspension may be measured as will be understood.

A dash-pot device 31 is received in a non-rotatable manner in the grooves 9 in the limbs 3 of the frame member 1 and is adhesively secured therein. The dash-pot device 31 is more clearly seen in Figs. 5 and 6 and comprises a substantially cylindrical member 32 having two chambers 33 formed therein for the full depth thereof, and a co-axial bore 34 formed therethrough, one end of the wall defining the bore 34 being cut away at two diametrically opposed places for a large part of its circumferential length as at 35 so that the bore 34 communicates with the chambers 33. The circumference of the member 32 lies on a cylinder having a diameter greater than the spacing between the bases of the grooves 9 and is cut away to provide two parallel flats 36 spaced apart by a distance equal to the spacing between the bases of the grooves 9. The flats 36 divide the circumference of the member 32 into two curved portions one of which is of smaller circumferential length than the other, the flats 36 extending at their one end from the smaller curved portion of the member 32 and terminating at their other end in a shoulder 37 joining the flats 36 to the larger curved portion of the member 32. Thus the member 32 may be inserted between the limbs 3 of the frame member 1 with its smaller curved portion leading so that the flats 36 fit against the bases of the grooves 9, the shoulders 37 engaging the limbs 3 to locate the member 32 in its correct position between the limbs 3. The member 32 may be formed with passages 38 therethrough to reduce its weight. The depth of the member 32 corresponds substantially to the width of the grooves 9 into which it is secured with the aid of an adhesive. The chambers 33 are closed by cover plates 39 (Fig. 7) which are each formed in two halves, each half having two lugs 39a whereby the covers 39 are secured by bolts or studs 39b to the limbs 3. Two diametrically opposed vanes 40 which cannot be seen in Fig. 7 but which are indicated in dotted lines in Fig. 6 are connected to the spindle 20a by stem portions 41 and are received one in each chamber 33 so that rotation of the suspension 20 rotates the vanes 40 within the chambers 33 against the effect of air displaced within the chambers by such rotation thereby providing a damping effect on such rotation as will be understood.

The frame member 1 is connected to a housing for the instrument by two spindles (not shown) one of which passes through the bushes 12 in the projections 10 of one limb 3 and the other of which passes through bushes 12 in the projections 10 of the other limb 3. The instrument will be housed in a metal, e.g. mu-metal casing as will be understood, apertures being provided in the casing to permit a beam of light to enter into and emerge therefrom.

The dynamometer type instrument shown in Figs. 8 and 9 embodies four moving coils 19 mounted on one or more axially aligned spindles carried by suspension wires 20 and four frame members 1 similar to that described with reference to Fig. 1 but modified slightly as will be described. The moving coils 19 are carried by the suspension one above the other for rotation about a substantially vertical axis, alternate coils 19 being disposed at right-angles to each other. The frame members 1 are mounted one above the other and the fixed coil parts 26 and 27 supported by the flanges 5 of the lugs 2 of the respective frame members 1 are omitted from all but that frame member immediately below the uppermost frame member for the sake of clarity. The upper end of the upper suspension wire 20 is received in a mounting device 21 similar to that shown in Fig. 7 carried on the limb 13 of the uppermost frame member 1 and the lower end of the lower suspension wire 20 is received in a mounting device 22 carried on the limb 14 of the lowermost frame member 1. The frame members 1 are mounted with the shoulders 7 disposed above the associated lugs 2 and the uppermost frame member 1 has its limbs 3 cut off just below the lower side of the grooves 9 formed therein thereby removing the limb 14 therefrom. Within the grooves 9 is disposed a locating element indicated generally at 42, this element having a portion 43 formed with two opposed flats 43a (Fig. 10) similar to the flats 36 (Fig. 5) on the dash-pot device 31, these flats 43a conveniently forming two sides of a hexagon, and a downwardly depending cylindrical portion 44. The hexagonal portion 43 is a relatively close fit in the grooves 9 and is non-rotatable therein. A bore 45 extends through the element 42 and the latter is slotted as at 46 to permit the spindles of the suspension to be passed through the slot 46 into the bore 45. The grooves 9 formed in the opposed limbs 3 of each frame member 1 except the lowermost frame member have fitted therein a locating element 42 the latter being preferably adhesively secured in the associated grooves 9. The grooves 9 of the lowermost frame member 1 accommodate a dash-pot device 31 in the manner described with reference to Fig. 7. The lowermost frame member 1 has the limbs 3 cut-off just above the shoulders 7 thereby removing the limb 13 and the shoulders 7 are each formed with the recess 8 described with reference to Fig. 1. These recesses 8 are so dimensioned that the downwardly depending portion 42 of the locating element 42 carried in the grooves 9 in the frame member 1 immediately above the lowermost frame member is a relatively close fit therein so that the frame members 1 are correctly located relative to each other and may rotate relative to each other. The two intermediate frame members 1 have both the upper limbs 13 removed in a manner similar to that described with reference to the lowermost frame member and the lower limbs 14 removed in a manner similar to that described with reference to the lowermost frame member and the lower limbs 14 removed in a manner similar to that described with reference to the uppermost frame member, the opposed limbs 3 being retained in spaced parallel relationship by the associated locating device 42 carried in the grooves 9 thereof.

It will be seen that all the frame members 1 except the uppermost one require to have the recesses 8 formed in the shoulders 7 to accommodate the downwardly depending portion 44 of the locating element 42 carried by the frame member 1 immediately thereabove. The shoulders 7 of the uppermost frame member 1 need not be formed with the recesses 8 and these shoulders support a clamping strip and member (not shown) similar to those shown at 25 and 25b in Fig. 7 which are adapted to co-operate with the cam (not shown) of a clamping element (not shown) corresponding to the cam 24 of the clamping element 23 shown in Fig. 7.

Alternate frame members 1 are mounted at right angles to the remainder thereof so that the fixed coil parts associated with each moving coil are contained between planes parallel to the axis of rotation and substantially normal to that plane which substantially contains the associated moving coil in the zero position of the instrument. The alternate frame members 1 are fixedly mounted in the housing of the instrument indicated at 47 by two spindles 48 which pass through the bushes 12 in the bores 11 of the associated extensions 10, collars 49 fixed to the spindles 48 by screws 50 prevent the alternate fixed frame members 1 from sliding axially on the spindles 48. The remaining frame members 1 are similarly carried on spindles 51 to which collars 52 are fixed by screws 53 to prevent these remaining frame members 1 moving axially of the spindles 51. These spindles 51 are not mounted in the housing so that the alternate frame members 1 carried by the spindles 51 may be rotated about the axis of the suspension 20 relative to the fixed frame members.

It will be understood that although the instrument described with reference to Figs. 8 and 9 is described as having a dash-pot device 31 in the grooves 9 of the lowermost frame member 1, this dash-pot device may be omitted in such instruments in which the damping is to be effected by electrical feed-back. In such cases it is preferred to mount an element similar to the locating elements 43 in the grooves 9 of the lowermost frame member 1 to improve the rigidity of the latter. Where the moving coils 19 are carried on a spindle mounted in bearings, the bearing for the lower end of the spindle may be carried by the dash-pot device 31 where one is employed or by the element replacing the dash-pot device where such a device is not employed. In such a case the bearing for the upper end of the spindle may be carried by an element supported by the shoulders 7 of the uppermost frame member 1 or by the limb 13 of the latter.

It will be appreciated that a dynamometer type instrument as described with reference to Figs. 8 and 9 may be readily assembled by semi-skilled labour with the aid of frame members 1 as described with reference to Fig. 1 which may be massed produced at an economic cost by a casting or moulding operation.

It will be further understood that alternate frame members are disposed at right angles to each other to reduce the effects of stray magnetic fields on the fixed and moving coils associated with the adjacent frame member and the ability to rotate one set of alternate frame members relative to the other enables these effects to be reduced to a minimum. This ability to rotate one frame member relative to another also has the marked advantage that the angular position of a fixed coil carried by one frame member may be readily adjusted relative to the associated moving coil for the initial setting up of the instrument. Furthermore, as will be understood, the bores 11 through the projections 10 or the bores through the bushes 12 may be larger than the diameters of the spindles passing therethrough or they may be elliptical so as to enable the frame members 1 of a set of alternate frame members to be angularly adjusted relative to each other during the setting up of the instrument the frame members 1 being clamped in the selected angular positions between the upper and lower collars 49 and 52. In practice the lowermost collars 49 and 52 may be sweated on to the associated spindles 48 and 51 respectively and the upper ends of these spindles may be threaded to receive a nut to replace the corresponding upper collars 49 and 52 these nuts being tightened to clamp the frame members 1 in the selected angular positions.

It will be understood that the instrument described with reference to Figs. 8 and 9 is normally housed in a casing of metal, e.g. mu-metal. It is frequently desirable to shield magnetically each moving coil 19 and its associated fixed coil from the adjacent moving and fixed coils and to this end the shield 54 shown in Figs. 11 and 12 may be employed between adjacent frame members 1 in the manner shown in Fig. 13. This shield 54 is a metal disc 55, e.g. formed from mu-metal, having a depending peripheral flange 56 and a central circular depression 57 adapted to receive the depending cylindrical portion 44 of a locating member 42. The underside of the depression 57 is adapted to be received in the recesses 8 in the shoulders 7 of a frame member 1. The disc 55 is formed with a central aperture 58 through which the suspension may pass and a slot 59 extends from the periphery of the disc to the aperture 58 to allow the suspension to be readily introduced through the aperture 58. Four apertures 60 are formed at 90° intervals in the disc to accommodate the spindles 48 and 51 and these apertures may be larger than the diameters of the spindles, or elliptical, as will be understood to permit adjacent frame members 1 to be angularly adjusted relative to each other. The casing for the instrument is cylindrical and the outer diameter of the disc 55 is slightly less than that of the case so as to provide a low reluctance path for any stray magnetic fields. If desired two discs 55 may be provided between adjacent frame members 1, the two discs sandwiching between them a body of insulating material.

What I claim is:

1. A dynamometer type electrical measuring instrument comprising a pair of limbs of an insulating material, each limb having a lug formed integral therewith intermediate the length thereof and extending away from one side of the associated limb in a direction substantially normal to the general direction of length of the limb, a shoulder formed on each limb on said one side thereof and located to one side of said lug, a groove formed in each limb in said one side thereof and located to the other side of said lug for receiving a dashpot device slidable thereinto, means secured to both limbs of said pair to maintain said limbs in spaced parallel relationship with said lugs extending towards each other, means for supporting said limbs within the instrument, a fixed coil carried and located by said lugs and a moving coil mounted for rotation about an axis extending substantially parallel to the general direction of length of said limbs.

2. A dynamometer type electrical measuring instrument according to claim 1 wherein said means secured to both limbs comprises a further limb extending between the one ends of said pair of limbs and formed integrally therewith.

3. A dynamometer type electrical measuring instrument according to claim 1 wherein said pair of limbs is provided by the opposed sides of a substantially rectangular frame member of unitary construction.

4. For use in a dynamometer type instrument embodying a fixed coil and a moving coil rotatable about an axis, a substantially rectangular unitary frame member of insulating material having a lug formed on each of two opposed limbs of said member and integral therewith, said lugs being located intermediate the length of said limbs and extending towards each other to support and locate said fixed coil, a shoulder formed on each of said opposed limbs to one side of said lugs, a groove formed in each of said opposed limbs to the other side of said lugs for receiving a dashpot device slidable thereinto and a locating projection formed integrally with each limb and extending away therefrom in a direction opposite to said lugs.

5. A dynamometer type electrical instrument comprising a housing, a substantially rectangular unitary frame member of insulating material having a lug formed on each of two opposed limbs of said member and integral therewith, said lugs being located intermediate the length of said limbs and extending towards each other, a two-part fixed coil supported on and located by said lugs, a moving coil, means supporting said moving coil for rotation about an axis extending substantially parallel to said opposed limbs and disposed substantially midway therebetween, a shoulder formed on each of said opposed limbs to one side of and spaced from said lugs, clamping means extending between and carried on said shoulders and operable to engage said moving coil supporting means to prevent rotation of said moving coil, a groove formed in each of said opposed limbs to the other side and spaced from said lugs, a dash-pot device extending between and located in said grooves, said dashpot device being slidable in said grooves in a direction transverse to said axes, damping means carried on said moving coil supporting means and disposed within said dash-pot device to damp rotation of said moving coil, a projection formed integrally with each of said opposed limbs and extending outwardly away therefrom and frame supporting means mounted in said housing in engagement with said projections to locate and support said frame member.

6. A dynamometer type electrical measuring instrument according to claim 5 wherein said dash-pot device comprises a substantially cylindrical member having a diameter greater than the spacing between the bases of said grooves and having two chambers formed therein for the full depth thereof, a co-axial bore formed therethrough, one end of the wall defining said bore being cut away at two diametrically opposed locations so that said bore communicates with said chambers, two parallel flats formed on the outer wall of said cylindrical member and spaced apart by a distance substantially equal to the spacing between the bases of said grooves, said flats dividing the circumference of said cylindrical member into two curved portions one of which is of smaller circumferential length than the other and is capable of passing between said opposed limbs with a part of the length of said flats received within said grooves said flats extending at their one end from the opposite ends of the smaller curved portion and terminating at their other end in a shoulder portion joining said flats to the opposite ends of the larger curved portion, said shoulder portions of said cylindrical member abutting against said opposed limbs to locate said cylindrical member relative thereto, and cover plates substantially closing said chambers and secured to said opposed limbs.

7. A dynamometer type electrical measuring instrument according to claim 5 wherein said unitary frame member with said lugs, said shoulders, said grooves and said projections is a cast member.

8. A dynamometer type electrical measuring instrument comprising a housing, a plurality of moving coils, means for supporting said moving coils one above the other for rotation about an axis with adjacent moving coils disposed at right angles to each other, a number of pairs of similar limbs of insulating material corresponding in number to the number of moving coils and extending in a direction substantially parallel to said axis said pairs of limbs being disposed one above the other and each associated with a separate one of said moving coils, a lug formed intermediate the length of and integrally with each limb and extending towards the lug formed on the other limb of a pair a two-part fixed coil located on and supported by the lugs of a pair of limbs, each two-part fixed coil being disposed at right angles to the associated moving coil in the zero-position of the instrument and the medial plane of each pair of limbs and lugs being disposed substantially at right angles to the corresponding plane of the adjacent pair of limbs a shoulder formed on each limb to one side of and spaced upwardly from the associated lug, a groove formed in each limb to the other side of and spaced downwardly from the associated lug, locating means associated with each pair of limbs other than the lowermost pair and extending between and received in the grooves of the associated pair of limbs and engaging the shoulder of the next lower pair of limbs, a dash-pot device extending between and received in the grooves of the lowermost pair of limbs, said dashpot device being slidable in said grooves in a direction transverse to said axes, damping means carried by said moving coil supporting means and co-operating with said dash-pot device to damp rotation of said moving coils, a projection formed integrally with each limb and extending outwardly away therefrom and two sets of limb supporting means mounted in said housing, one set of limb supporting means engaging the projections of every other pair of limbs and the other set engaging the projections of the remaining pairs of limbs.

9. A dynamometer type electrical measuring instrument according to claim 8 wherein each shoulder of a limb is formed with a part cylindrical recess co-axial with said axis and each locating means comprises a first portion extending between and non-rotatably secured in the grooves of the associated pair of limbs to maintain the latter in spaced relationship and second downwardly depending annular portion received in the recesses of the next lower pair of limbs whereby the latter are capable of being rotated relative to the adjacent pair of limbs.

10. A dynamometer type electrical measuring instrument according to claim 9 wherein said projections on said limbs are each formed with a substantially cylindrical bore having an axis extending substantially parallel to said axis of rotation of said moving coils, said one set of limb supporting means comprises a first pair of spindles fixedly mounted in said housing one spindle passing through the bore in the projection of one limb of every other pair of limbs and the other spindle passing through the bore in the projection of the other limb of said every other pair of limbs, and said other set of limb supporting means comprises a second pair of spindles adjustably mounted in said housing, one spindle of said other set passing through the bore in the projection of one limb of the remaining pairs of limbs and the other spindle of said other set passing through the bore in the projection of the other limb of said remaining pairs of limbs whereby the orientation of said remaining pairs of limbs relative to said every other pair of limbs is adjustable.

11. A dynamometer type electrical measuring instrument according to claim 8 wherein an annular metal shield is interposed between each locating means and the shoulders of the next lower pair of limbs.

12. A dynamometer type electrical measuring instrument according to claim 8 wherein the uppermost pair of limbs are joined to each other at their upper ends by a further limb formed integrally therewith and the lowermost pair of limbs are joined to each other at their lower ends by a still further limb formed integrally therewith.

References Cited in the file of this patent
UNITED STATES PATENTS
1,370,179   Angus ------------------ Mar. 1, 1921